(12) United States Patent
Nielsen et al.

(10) Patent No.: US 12,350,893 B2
(45) Date of Patent: Jul. 8, 2025

(54) METHOD OF MANUFACTURING A WIND TURBINE BLADE

(71) Applicant: LM WIND POWER A/S, Kolding (DK)

(72) Inventors: Lars Nielsen, Kolding (DK); Klavs Jespersen, Kolding (DK)

(73) Assignee: LM WIND POWER A/S, Kolding (DK)

( * ) Notice: Subject to any disclaimer, the term of this patent is extended or adjusted under 35 U.S.C. 154(b) by 84 days.

(21) Appl. No.: 18/254,125

(22) PCT Filed: Dec. 22, 2021

(86) PCT No.: PCT/EP2021/087179
§ 371 (c)(1),
(2) Date: May 23, 2023

(87) PCT Pub. No.: WO2022/136487
PCT Pub. Date: Jun. 30, 2022

(65) Prior Publication Data
US 2024/0001628 A1     Jan. 4, 2024

(30) Foreign Application Priority Data

Dec. 23, 2020  (GB) ...................................... 2020936

(51) Int. Cl.
*B29C 70/34*    (2006.01)
*B29C 70/54*    (2006.01)
(Continued)

(52) U.S. Cl.
CPC .......... *B29C 70/342* (2013.01); *B29C 70/548* (2013.01); *B29K 2105/0809* (2013.01); *B29K 2105/106* (2013.01); *B29L 2031/085* (2013.01)

(58) Field of Classification Search
CPC ............................. B29C 70/342; B29C 70/548
See application file for complete search history.

(56) References Cited

U.S. PATENT DOCUMENTS

| | | |
|---|---|---|
| 2003/0025232 A1 | 2/2003 | Slaughter et al. |
| 2013/0099426 A1 | 4/2013 | Heim et al. |
| 2021/0323253 A1* | 10/2021 | Lu .............................. B32B 3/30 |

FOREIGN PATENT DOCUMENTS

| | | | |
|---|---|---|---|
| CN | 104619479 A * | 5/2015 | ............. B29C 43/12 |
| DE | 102013012005 A1 | 1/2015 | |

(Continued)

OTHER PUBLICATIONS

Machine translation CN104619479A (Year: 2015).*

*Primary Examiner* — Jacob T Minskey
*Assistant Examiner* — Wayne K. Swier
(74) *Attorney, Agent, or Firm* — Nath, Goldberg & Meyer; Jerald L. Meyer; Tanya E. Harkins

(57) ABSTRACT

Method for manufacturing a wind turbine blade comprising an aerodynamic shell forming an outer surface of the blade and at least one main laminate, the method comprising; providing a mould 13, forming a main laminate 18 in the mould by providing a fibre lay-up comprising a plurality of fibre plies placed on top of each other in the mould 13, dividing the fibre lay-up into at least two segments as seen in the longitudinal direction of the mould by at least one transverse flow barrier 54,55 in the lay-up preventing longitudinal resin flow through the fibre lay-up past the flow barrier 54,55.

19 Claims, 7 Drawing Sheets

(51) Int. Cl.
*B29K 105/08* (2006.01)
*B29K 105/10* (2006.01)
*B29L 31/08* (2006.01)

(56) References Cited

FOREIGN PATENT DOCUMENTS

| | | | | |
|---|---|---|---|---|
| EP | 1428650 | A1 | 6/2004 | |
| EP | 2404743 | A1 | 1/2012 | |
| EP | 2404743 | B1 * | 6/2013 | ........... B29C 70/443 |
| JP | 2009-269283 | A | 11/2009 | |
| WO | 2006/082479 | A1 | 8/2006 | |
| WO | WO-2014006131 | A2 * | 1/2014 | ............. B29C 43/12 |

* cited by examiner

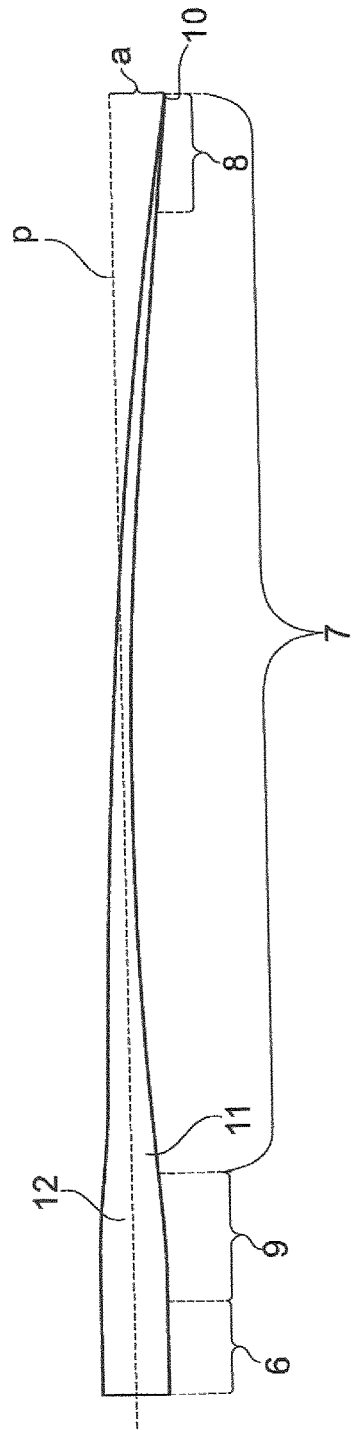
Fig. 2
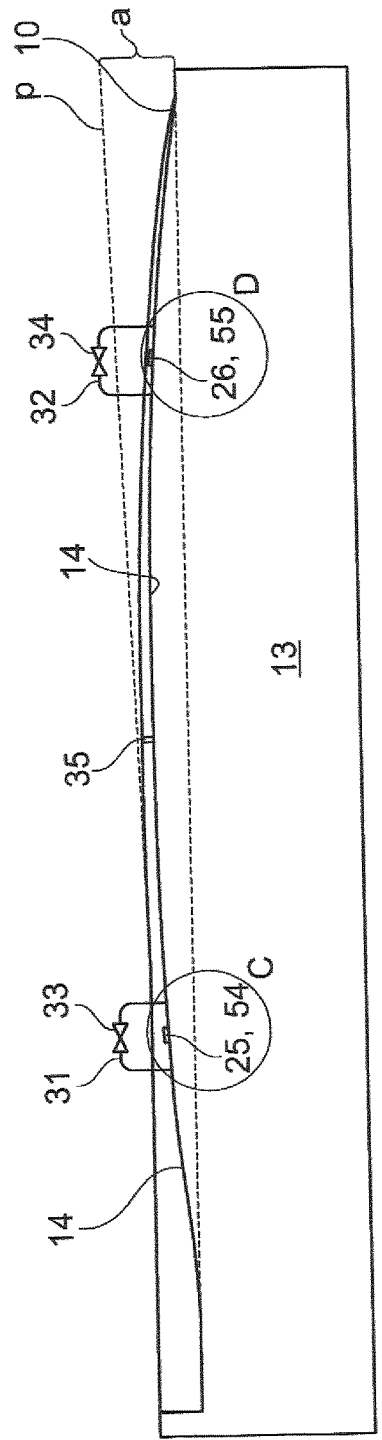
Fig. 3
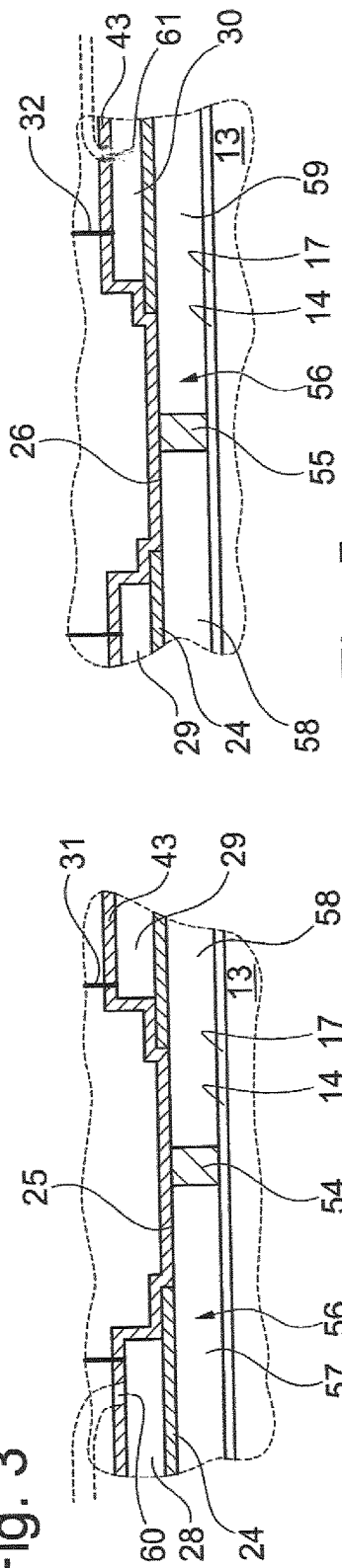
Fig. 5
Fig. 4

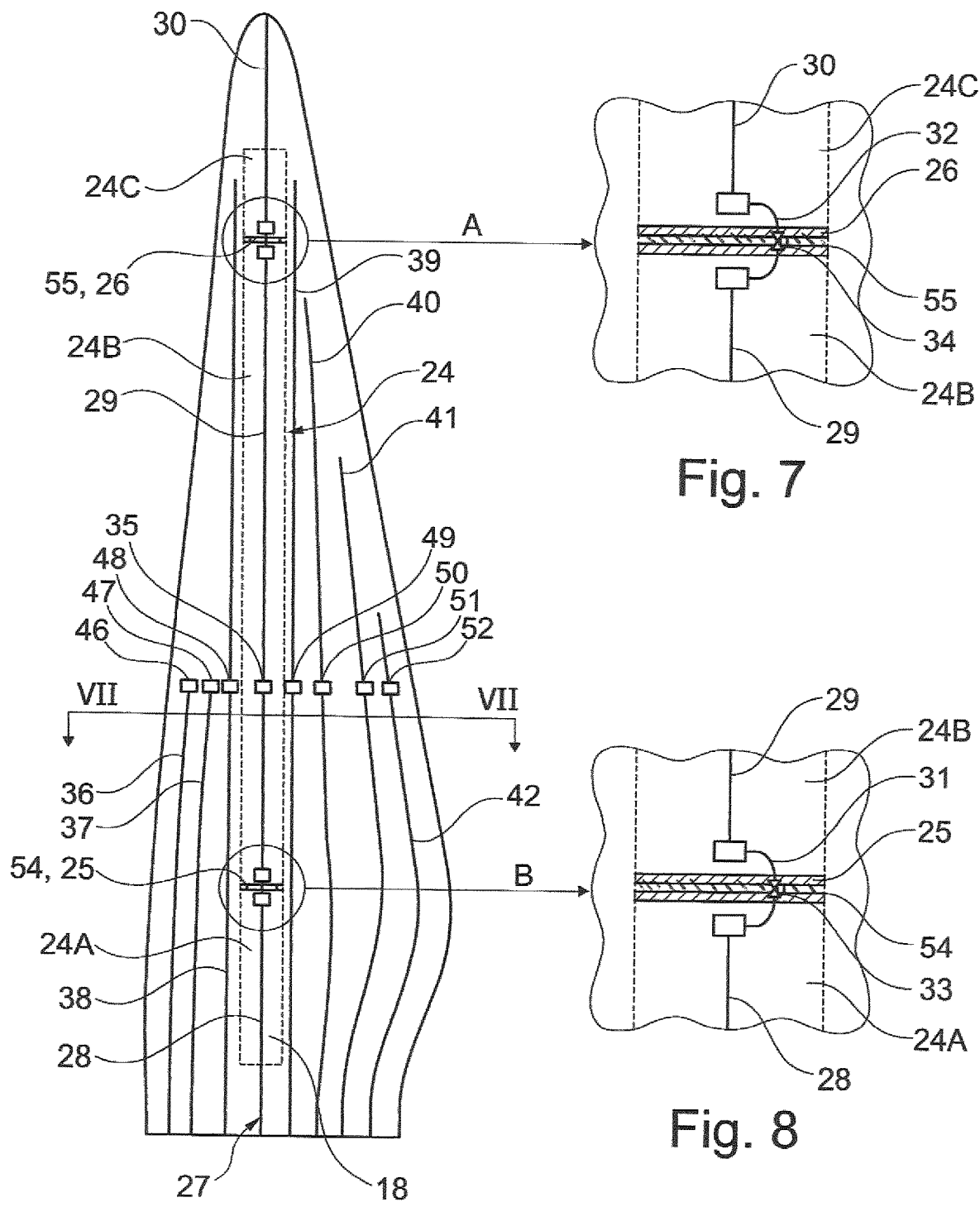

METHOD OF MANUFACTURING A WIND TURBINE BLADE

This is a National Phase Application filed under 35 U.S.C. 371 as a national stage of PCT/EP2021/087179, filed Dec. 22, 2021, and application claiming the benefit of United Kingdom Application No. 2020936.7, filed Dec. 23, 2020, the content of each of which is hereby incorporated by reference in its entirety.

The present invention relates to a method for manufacturing a wind turbine blade comprising an aerodynamic shell forming an outer surface of the blade and at least one main laminate, especially a pre-bent wind turbine blade, and especially by means of Vacuum Assisted Resin Transfer Moulding (VARTM).

BACKGROUND

The invention particularly relates to a method for manufacturing pre-bent blades typically assembled from blade shell halves. One of the shell halves forms the pressure side of the blade, also named the up-wind shell half, and the other shell half forms the suction side of the blade, also named the down-wind shell half.

By a pre-bent blade is to be understood a blade, which, as seen from the root region of the blade towards the tip region of the blade at a distance from the tip region, extends forwards in a forwardly curving manner so that the tip region of the blade is positioned in front of the centre line of the root region of the blade. An example of a pre-bent wind turbine blade is disclosed in EP 1 019 631 B1.

Wind turbine blades made of composite materials such as fibre-reinforced resin are flexible and when subjected to a gust they may flex more than 8 m at the tip dependent on the length of the blade. Pre-bent blades may have such a curvature that the tip is arranged more than 4 m from the centre line of the root region.

Wind turbine blades have become progressively longer in course of time and can today be more than 100 m long.

When manufacturing the shell halves of especially pre-bent blades, the fibre/resin ratio tends to be higher in the highest positioned areas of the mould surface than in the lowest positioned regions of the mould as seen in the longitudinal direction of the mould. This is especially the case in a longitudinally extending zone located at the lowest area of the mould as seen in the transverse direction thereof. In the above zone, a plurality of fibre layers is frequently placed on top of each other in order to form a load-bearing structure of the blade shell half comprising a substantially higher number of fibre layers than laterally adjacent areas of the fibre lay-up. The load-bearing structure is also named the main laminate and the spar cap.

As mentioned above, due to the gravity acting on the resin, a too high fibre/resin ratio tends to be formed at the highest positioned areas of the mould, and a too low fibre/resin ratio tends to be formed in the lowest positioned areas of the mould as seen in the longitudinal direction thereof.

A too high fibre/resin ratio has a negative influence on the fatigue strength of a composite material comprising fibre-reinforced resin. This is especially a problem when moulding the upwind shell half as the highest positioned area of the mould surface is in the mid portion of the shell half when seen in the longitudinal direction of the mould and as the mid portion of the blade is subjected to high loads during operation of the wind turbine.

EP 2 404 743 B1 discloses a method to ameliorate the above problem by dividing a flow-aiding layer, a so-called liquid distribution layer or infusion mesh, above the fibre lay-up of the main laminate into separate lengthwise segments so as to limit the height difference within each segment to a defined maximum and thereby minimise the gravity acting on the resin with the effect that the fibre/resin ratio can be more effectively controlled. However, even in this manufacturing set-up, it has proven difficult to control the fibre/resin ratio of the different areas of especially the main laminate of the wind turbine blade to a high degree.

It is an object of the present invention to provide a new manufacturing method which overcomes or ameliorates at least the above disadvantage of the prior art and allow for an improved control of the fibre/resin ratio in the main laminate.

SUMMARY

The above object of the present invention is obtained by a method of manufacturing a wind turbine blade comprising an aerodynamic shell forming an outer surface of the blade and at least one main laminate, especially a pre-bent wind turbine blade, the method comprising the steps of:
  a. providing a mould extending in a longitudinal direction,
  b. forming a longitudinally extending main laminate by arranging a fibre material lay-up comprising a plurality of longitudinally continuously extending fibre fabric layers or fibre plies placed on top of each other in the mould,
  c. during step b, providing at least one segmentation area in the fibre lay-up dividing the fibre lay-up into at least two fibre lay-up segments as seen in the longitudinal direction of the mould by providing at least one transverse flow barrier in the fibre lay-up, the transverse flow barrier preventing or restricting longitudinal resin flow through the fibre lay-up past the flow barrier,
  d. infusing the fibre lay-up in the mould with a first liquid resin supplied to the mould through one or more resin inlet(s)
  e. allowing the first resin to cure By providing a segmentation of the fibre lay-up of the main laminate by means of at least one transverse flow barrier preventing or restricting longitudinal resin flow through the fibre lay-up past the flow barrier, it is possible to control the resin flow through the fibre lay-up of the main laminate in the longitudinal direction of the mould, so that the desired fibre/resin ratio is obtained in essentially any area of the main laminate.

Step d, infusing the fibre lay-up in the mould, can be carried out by Vacuum Assisted Resin Transfer Moulding (VARTM), wherein step d may comprise the following steps after step c and prior to step e:
  providing a vacuum bag and arranging it on top the mould part,
  sealing the vacuum bag to the rigid mould part to provide a mould cavity, and
  evacuating the mould cavity and supplying a first liquid resin to the mould cavity through a resin inlet.

The first resin is typically epoxy, polyester or vinyl ester.

According to a preferred embodiment, there is in step c provided at least two mutually spaced segmentation areas the fibre lay-up, whereby the fibre lay-up is divided into at least three fibre lay-up segments as seen in the longitudinal direction of the mould.

According to a further embodiment, at least a majority of the fibre fabric layers placed on top of each other are unidirectional fibre fabrics layers (UD fabrics), especially UD carbon fibre fabrics, the direction of the UD fibres corresponding essentially to the longitudinal direction of the mould.

Essentially, all the fibre fabric layers placed on top of each other can be unidirectional fibre fabrics layers (UD fabrics), especially UD carbon fibre fabrics, the direction of the UD fibres corresponding essentially to the longitudinal direction of the mould.

According to an additional embodiment, the method comprises the following step after step c and prior to step d:
  c1. arranging a resin distribution layer above the fibre lay-up.

According to an embodiment, the method comprises the following step subsequent to step c1 and prior to step d:
  c2. dividing the resin distribution layer into at least two distribution layer segments as seen in the longitudinal direction of the mould by providing at least one transversely extending distribution layer flow barrier preventing or restricting longitudinal resin flow through the distribution layer.

The method may comprise the following step subsequent to step c1 and prior to step d:
  c2. dividing the resin distribution layer into at least three distribution layer segments as seen in the longitudinal direction of the mould by providing at least two mutually spaced transversely extending distribution layer flow barriers preventing or restricting longitudinal resin flow through the distribution layer.

In step c2, an embodiment comprises providing the transversely extending distribution layer flow barrier by omitting the distribution layer in a transversely extending portion thereof.

The transversely extending portion, in which the distribution layer is omitted, can have a width of 5-50 cm, such as 5-40 cm or 5-30 cm, as seen in the longitudinal direction of the mould.

In step c2, the transversely extending distribution layer flow barrier can be provided by applying a formable substance, such as a so-called tacky tape to the distribution layer in a transversely extending portion thereof.

The transversely extending distribution layer flow barrier provided by applying a formable substance can have a width of 0.5-10 cm, such as 0.5-5 cm or 0.5-2 cm, as seen in the longitudinal direction of the mould.

The distribution layer can be divided into distribution layer segments adjacent to or in the segmentation areas in which the fibre lay-up is divided into fibre lay-up segments so that, as seen in the longitudinal direction, a height difference between a lowest and a highest level of the lay-up in any lay-up segments is at most 2.4 m, such as 2.0 m, 1.6 m, 1.4 m, 1.2 m, 1.0 m or 0.8 m.

According to an embodiment, the method comprises the following step subsequent to step c2 and prior to step d:
  c3. placing at least one first longitudinally extending resin feed channel above the fibre distribution layer, said first feed channel being open towards the fibre distribution layer so as to provide resin communication with the resin distribution layer.

In the above embodiment, said first feed channel can be divided into at least two separate feed channel segments, a feed channel segment being arranged in each distribution layer segment, and a resin inlet being provided in each of the two feed channel segments so as to allow feeding resin to each of the at least two distribution layer segments.

In the above embodiment, said first feed channel can be divided into at least three separate feed channel segments, a feed channel segment being arranged in each distribution layer segment, and a resin inlet being provided in each of the three feed channel segments so as to allow feeding resin to each of the at least three distribution layer segments.

The resin inlet is preferably arranged at or adjacent to the highest level of the fibre lay-up of the lay-up segment in question.

The first feed channel can extend essentially the entire length of the mould as seen in the longitudinal direction of the mould.

According to an embodiment, the first feeding channel is divided into feed channel segments, and the distribution layer is divided into distribution layer segments adjacent to or in a segmentation area in which the fibre lay-up is divided into fibre lay-up segments.

According to a further embodiment, the first feed channel is divided into feed channel segments, and the distribution layer is divided into distribution layer channels adjacent to or in a segmentation area in which the fibre lay-up is divided into fibre lay-up segments so that, as seen in the longitudinal direction, a height difference between a lowest and a highest level of the lay-up in any lay-up segments is at most 2.4 m, such as 2.0 m, 1.6 m, 1.4 m, 1.2 m, 1.0 m or 0.8 m.

According to an aspect of the method of the present invention, the transverse flow barrier in the fibre lay-up is a transverse strip of a second resin impregnated into and/or on a majority of the fibre fabric layers of the fibre lay-up, said strips of impregnated resin being arranged above each other for essentially preventing longitudinal resin flow through the fibre lay-up past the flow barrier.

According to an embodiment, essentially all the fibre fabric layers of the fibre lay-up comprise a transverse strip of the second resin impregnated into and/or on the respective layers of the fibre fabric lay-up, said strips of impregnated resin being arranged above each other.

According to an additional embodiment, the second resin of the strip impregnated with resin is of a resin type being compatible with the first resin type supplied to the mould. Thereby, it is possible to obtain a strong bond between the second resin of the transverse flow barrier and the first resin supplied to the mould during the infusion of the first resin to the mould.

According to an embodiment, the second resin of the strip impregnated with resin is of the same resin type as the first resin type supplied to the mould. Thereby, the bond between the second resin and the first resin is improved.

The second resin of the strip impregnated with resin can be at least essentially the same resin as the first resin supplied to the mould. Thereby, an optimal bond can be obtained between the second and the first resin.

The transverse strip of the second resin impregnated into and/or on the respective layers of the fibre fabric lay-up can be a pre-impregnated strip of resin.

By pre-impregnated strip of resin is to be understood that the strip of resin is impregnated in the respective layers of the fibre fabric lay-up prior to laying up the respective fibre fabric layers. However, it should be understood that the transverse strip also can be impregnated with resin in connection with laying up the respective layers of the fibre fabric lay-up.

The pre-impregnated resin can be a solidified resin.

According to an embodiment, the width of the transverse flow barrier of the second resin is 2 to 20 mm as seen in the longitudinal direction of the mould.

According to a further aspect of the method of the present invention, the transverse flow barrier in the fibre lay-up is a transverse strip of a substance applied to a majority of the fibre fabric layers of the fibre lay-up, said strips of the substance being arranged above each other for temporarily essentially preventing longitudinal resin flow through the fibre lay-up past the flow barrier, the substance being configured to be progressively at least partly dissolved and thereby allow longitudinal resin flow through the fibre lay-up, when coming into contact with the first resin during the infusion of the fibre lay-up with the first resin. Thereby, the flow barrier in the fibre lay-up can be dissolved in a progressively time synchronous manner with the resin infusion and an optimal infusion of the fibre lay-up and the desired fibre/resin ratio obtained.

The transverse flow barrier in the fibre lay-up can be a transverse strip of a substance applied to essentially all of the fibre fabric layers of the fibre lay-up, said strips of the substance being arranged above each other for temporarily essentially preventing longitudinal resin flow through the fibre lay-up past the flow barrier, the substance being configured to be progressively at least partly dissolved and thereby allow longitudinal resin flow through the fibre lay-up, when coming into contact with the first resin during the infusion of the fibre lay-up with the first resin.

According to an embodiment, the width of the transverse flow barrier of the substance is 1 mm to 50 mm or 1 mm to 40 mm or 1 mm to 30 mm or 1 mm to 20 mm as seen in the longitudinal direction of the mould.

According to a further embodiment, the substance of the strips of the flow barrier is configured to be at least partly dissolved to allow longitudinal resin flow through the fibre lay-up 15 min to 320 min after coming in contact with the first resin.

The substance can be a liquid substance, such as a binding agent, applied to the respective fibre layers.

The substance can be a powdered or particulate substance, such as a binding agent, applied to the respective fibre layers, such as by spraying.

The substance can be dissolvable by a first resin comprising styrene, such as a polyester resin or a vinyl ester resin.

The substance can comprise polyester, such as the powder binder Neoxil 940 or FILCO 661.

The transverse strip of the substance applied to the respective layers of the fibre fabric lay-up can be a pre-applied strip of substance.

By pre-applied strip of substance is to be understood that the strip of substance is applied to the respective layers of the fibre fabric lay-up prior to laying up the respective fibre fabric layers. However, it should be understood that the transverse strip also can be applied to the respective layers in connection with laying up the respective layers of the fibre fabric lay-up.

According to an embodiment of the method according to the present invention, the mould is a main laminate mould in which the at least one main laminate is formed and cured, and the method additionally comprises the following steps:
manufacturing of a cured aerodynamic blade shell half without main laminate in a shell half mould forming the outer surface of the blade, and
adhesively connecting the formed and cured main laminate to a longitudinal portion of the manufactured and cured aerodynamic blade shell half without main laminate.

The longitudinally extending portion of the shell half can be a recessed longitudinal portion of an inner surface of the shell half.

The main laminate can be adhesively connected to the aerodynamic shell half by infusing resin between the inner surface of the shell half and the main laminate.

According to an additional embodiment of the present invention, the mould is a blade shell half mould in which the shell half and the at least one main laminate is formed and cured, and the method additionally comprises the following step:
prior to step b, laying up a number of shell-forming fibre layers in the mould, the shell fibre layers defining the outer surface of the blade.

An additional method for manufacturing a wind turbine blade can be:
manufacturing a cured main laminate in a main laminate mould,
laying up a number of shell-forming fibre layers in a shell half forming mould,
arranging the manufactured and cured main laminate on top of the shell half forming fibre layers, and
infusing resin in the shell forming fibre layers and thereby adhesively connecting the cured main laminate to the shell half laminate in the mould.

A further possibility for manufacturing a wind turbine blade can be:
manufacturing a cured aerodynamic blade shell half in a shell half forming mould,
arranging a number of main laminate-forming fibre layers in the manufactured and cured aerodynamic shell half in the shell half forming mould, and
infusing resin in the shell half forming mould, thereby infusing the main laminate forming fibre lay-up and adhesively connecting the main laminate to the shell half laminate.

The present invention additionally relates to a wind turbine blade manufactured by a method according to the method according to the present invention, a wind turbine rotor comprising at least one blade manufactured by means of the method according to the present invention and a wind turbine comprising a wind turbine rotor comprising at least one blade.

BRIEF DESCRIPTION OF THE FIGURES

Embodiments of the invention will be described in more detail in the following with regard to the accompanying figures. The figures show one way of implementing the present invention and are not to be construed as being limiting to other possible embodiments falling within the scope of the attached claim set.

FIG. 2 is a side schematical view of one of the blades shown in FIG. 1, FIG. 3 is a schematical longitudinal sectional view of a rigid mould part for forming the pressure side, i.e. the upwind side of a blade shell half, FIG. 4 is an enlarged schematical view of the encircled area C in FIG. 3, FIG. 5 is an enlarged schematical view of the encircled area D in FIG. 3, FIG. 6 is a schematical top view of the mould part shown in FIG. 3, the width of said mould part being enlarged for illustrative purposes, FIG. 7 is an enlarged schematical top view of the encircled area A in FIG. 6, FIG. 8 is an enlarged schematical top view of the encircled area B in FIG. 6.

DETAILED DESCRIPTION

Figure 1:
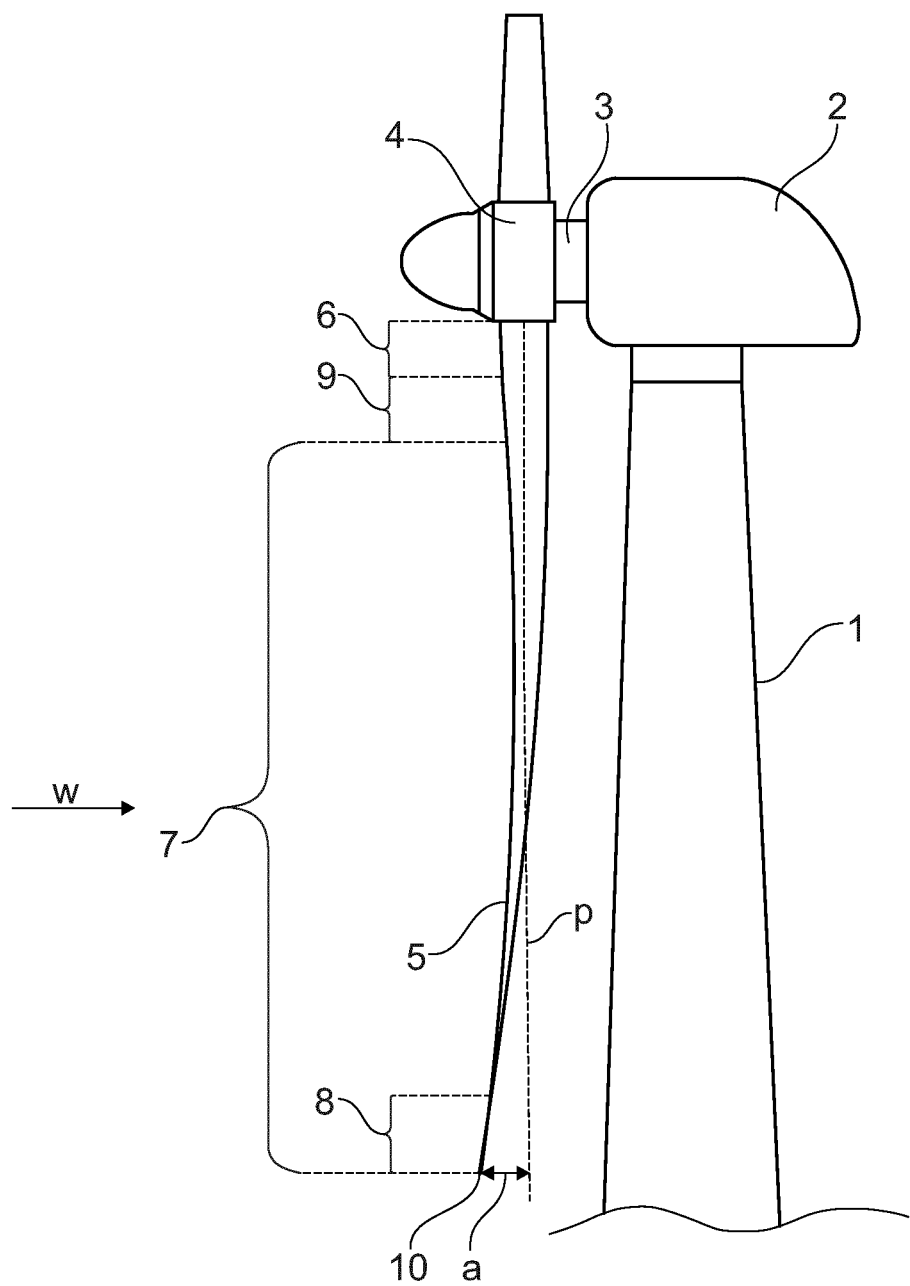
FIG. 1 is a schematical view of a wind turbine provided with three pre-bent blades, at least one of these blades having a blade shell half being manufactured by a method according to the invention.
Figure 9:
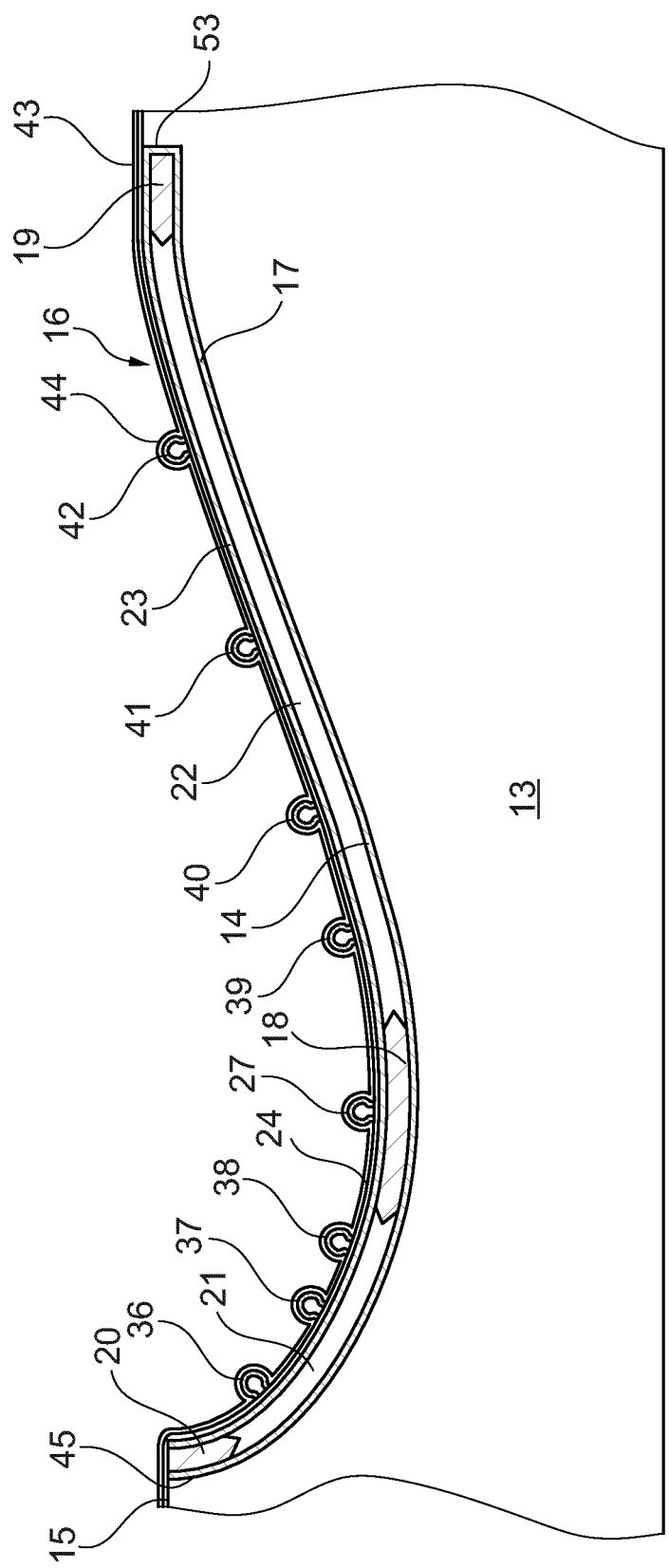
FIG. 9 is a schematical cross-sectional view along the lines IX-IX in FIG. 6.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

The upwind wind turbine schematically shown in FIG. 1 comprises a tower 1, a nacelle 2 arranged rotatably on top of the tower 1, a main shaft extending essentially horizontally from the nacelle 2 and being provided with a hub 4 from which three blades 5 extend essentially radially. Each blade comprises a root region 6, an airfoil region 7 with a tip region 8, a transition region 9 between the root region 6 and the airfoil region 7, and a centre line P being defined by the centre line of the normally cylindrically shaped root region. This axis often corresponds to a pitch axis of the blade. The tip region 8 of the airfoil region 7 ends in a tip 10. The different regions of the blade are also shown in FIG. 2.

The blade 5 is a pre-bent blade extending forwardly against the wind in a forwardly curving manner so as to place the tip 10 at a distance a in front of the centre line P as seen in the wind direction W. The blade 5 comprises two blade shell halves 11,12 connected along a leading edge and a trailing edge of the blade. The blade shell half 11 forms the pressure side, also called the upwind side, of the blade as it faces the wind during operation of the wind turbine. The blade shell half 12 forms the suction side, also called the downwind side, of the blade as it faces away from the wind during operation of the wind turbine.

References are now made to FIGS. 3-9, and a first embodiment of the method according to the invention will be described with reference to the production of the blade shell half 11 forming the upwind side of the blade, the method comprising infusing fibre in a mould with a first resin by VARTM.

For manufacturing the blade shell half 11, a rigid mould part 13 is provided, said mould part 13 having a mould surface 14 forming the outer surface of the shell half, i.e. the pressure side of the blade. The mould part 13 is provided with an upper rim 15, as clearly seen in FIG. 9. As it most clearly appears from FIG. 3, the mould for moulding the upwind shell half is arranged so that the line of the mould part corresponding to the centre line P of the root region of the blade is arranged tilted slightly upwards relative to horizontal from the root region towards the tip region. In the present embodiment, the lowermost portion of the mould surface in the root region and the tip region is arranged essentially at the same level, as shown in FIG. 3. As a result, the height difference between the highest and the lowest point of the lowermost portion of the mould surface is minimised as seen in the longitudinal direction.

A lay-up 16 comprising a number of fibre fabric layers is placed on the mould surface. In the embodiment shown, the fibre lay-up comprises first fibre fabric layers 17 arranged on the mould surface 14. On the first fibre layers, a large number of fibre fabric layers are placed in a longitudinally extending zone of the mould so as to provide a load-bearing structure 18, also named main laminate or spar cap, of the blade shell half. As seen in the transverse direction of the mould, the zone forming the load-bearing structure 18 is provided in the lowermost area of the mould surface. In the longitudinal direction, the zone extends essentially from the root region to the tip region, as shown by dotted lines in FIG. 6. The fibre layers of the main laminate 18 may also be named main laminate fibre layers, and the lay-up of the main laminate may be named main laminate lay-up. Additionally, a plurality of fibre layers is arranged on the first lower fibre layers 17 at a region corresponding to the region of the leading edge and the trailing edge, respectively of the blade shell half to provide a leading edge fibre reinforcement 19 and a trailing edge fibre reinforcement 20. A first core material 21 is arranged between the main laminate 18 and the leading edge fibre reinforcement 19, and a second core material 22 is arranged between the main laminate 18 and the trailing edge fibre reinforcement. The core material can be a hard polymer foam or balsa wood. The fibre lay-up 16 can be completed by optionally arranging second fibre layers 23 on top of the main laminate 18, the leading edge fibre reinforcement 19, the trailing edge fibre reinforcement 20, the first core material 21 and the second core material 22.

The fibre fabric layers forming the fibre lay-up of the longitudinally extending main laminate 18 are continuously extending fibre layers or fibre plies placed on top of each other. The majority of the fibre fabric layers of the main laminate 18 are unidirectional fibre fabric layers (UD fabrics), especially UD carbon fibre fabrics, the direction of the UD fibres corresponding essentially to the longitudinal direction of the mould and thereby also essentially to the longitudinal direction of the blade shell half.

During laying up the fibre fabric layers of the main laminate, two mutually spaced segmentation areas are formed dividing the fibre lay-up of the main laminate 18 into three fibre lay-up segments, a first fibre lay-up segment 57, a second fibre lay-up segment 58 and a third fibre lay-up segment 59, as seen in the longitudinal direction of the mould by providing two transverse flow barriers 54,55 in the fibre lay-up, each of the transverse flow barriers 54,55 essentially preventing longitudinal resin flow through the fibre lay-up past the respective flow barrier 54,55.

In the first embodiment, each transverse flow barrier 54,55 is a transverse strip of a second resin impregnated into and/or on a majority of the fibre layers of the main laminate fibre lay-up, the strips of impregnated resin being arranged above each other for essentially preventing longitudinal resin flow of the first resin through the main laminate fibre lay-up past the flow barrier 54,55 formed by the second resin.

After the optional arrangement of second fibre layers 23, a distribution layer 24 is arranged on top of the fibre lay-up. The distribution layer is divided into three distribution layer segments 24A, 24B, 24C by providing two mutually longitudinally spaced distribution layer flow barriers 25,26 in the distribution layer in areas thereof above the main laminate 18. The distribution layer flow barriers 25,26 have a transverse extension so that they are only provided in the area of the distribution layer above the main laminate 18 and not in the adjacent area of the lay-up 16. In the present embodiment, the distribution layer flow barriers 25,26 are provided by omitting the distribution layer in transversely extending portions thereof.

As especially shown in FIGS. 3, 4 and 5, the distribution layer can be divided into distribution layer segments adjacent to or in the segmentation areas in which the fibre lay-up is divided into fibre lay-up segments so that, as seen in the longitudinal direction, a height difference between a lowest and a highest level of the lay-up in any lay-up segments is within a predetermined range, such as below 1.0 m.

A longitudinally extending first feed channel 27 is arranged on top of the distribution layer 24. The first feed channel 27 is formed as a tube with an omega profile being open towards the distribution layer 24. The first feed channel extends from the root region to the tip region as shown in FIG. 6. It is divided into three feed channel segments 28,29,30 which are arranged in respective distribution layer segments. Longitudinally adjacent sections of the first feed channel 27 are interconnected by means of a connection line 31,32, a so-called jumper, to provide resin communication between adjacent feed channel segments. A valve 33,34 is arranged in each connection line 31,32 to allow for an interruption of the resin flow between adjacent feed channel segments. A resin inlet 35 to the first feed channel is preferably provided at or in the highest area of the first feed channel which is also the highest area of the mould surface as seen in the longitudinal direction of the mould. Finally, it should be noted that instead of a jumper between adjacent feed channel segments, each feed channel segment could be provided with a separate resin inlet 60,61, as indicated by dotted lines in FIGS. 4 and 5.

Further, additional substantially longitudinally extending feed channels 36-42 are arranged above the distribution layer 24 on either side of and laterally spaced from the longitudinally first feed channel 27. As seen in FIG. 6, the additional feed channels are not divided into sections, and the transversely extending distribution layer flow barriers are in the present example not provided in the distribution layer below the additional feed channels. Further, the additional feed channels 36-42 are placed laterally outside the main laminate 18. Resin inlets 46-52 to the additional feed channels are arranged in line with the resin inlet 35 to the first feed channel as seen in transverse direction of the mould.

A vacuum bag 43 is arranged on top of the distribution layer 24 and the feed channels and sealed to the rim 15 of the mould part to form a mould cavity 44 between the vacuum bag 43 and the mould surface 14 of the mould part 13.

As an example, the first resin is supplied to the mould cavity through the inlet 35 to the mid-section 29 of the first feed channel and through the inlets 46-52 to the additional feed channels. First, the first resin is supplied to the first feed channel 27, the valves 33,34 in the connection lines 31,32 being opened so that all three sections 28,29,30 of the first feed channel 27 are supplied with first resin. When the first resin flow front towards the leading edge has passed the feed channel 38, first resin is supplied to the feed channel 38 through the inlet 48. Correspondingly, first resin is supplied to the feed channel 39 through the inlet 49 when the first resin flow front towards the trailing edge has passed the feed channel 39.

Then, the valves 33,34 are closed to stop supply of the first resin to sections 28,30 of the first feed channel 27. Supply of first resin to the highest positioned section 29 of the first feed channel 27 is continued. First resin is then supplied in sequence to the feed channel 40, the feed channel 37, the feed channel 41, the feed channel 38 and the feed channel 42 through the respective inlets 50,47,51,46,52. During the sequential supply of first resin to the above feed channels, the supply of first resin to the feed channels 39,38,40,37,41,36,42 is stopped at pre-determined points in time so as to obtain the desired resin impregnation of the lay-up. After the resin supply to all the additional feed channels has been stopped, the resin supply to the inlet to the first feed channel continues until the desired fibre/resin ratio has been obtained in the fibre lay-up, especially in the zone of the fibre lay-up forming the main laminate 18.

The provision of the distribution layer flow barriers 25,26 restricts or prevents flow of first resin through the distribution layer from the distribution layer segment 24B to the distribution layer segments 24A and 24C being positioned at a lower level than the distribution layer segment 24B during the continuous supply of resin to the feed channel segment 27 being positioned above the distribution layer segment 24B. Further importantly, the fibre lay-up barriers 54,55 in the main laminate 18 essentially prevent flow of first resin from the central second fibre lay-up 58 of the main laminate into the lower positioned first and third fibre lay-up 56,58. Thereby, the desired fibre to resin ratio is obtainable essentially throughout the blade shell half and especially and very importantly throughout the main laminate 18. At the same time during the supply of liquid first resin to the lay-up, forming the main laminate, liquid first resin is coming into intimate contact with the fibre lay-up barriers 54,55 and is unified with the barriers to form a homogeneous resin mass. When the supply of first resin is completed, the first resin is allowed to cure, and the finished blade shell half forming the upwind side of the blade is connected to a finished blade shell half forming the downwind side of the blade, thereby forming a wind turbine blade.

Reference is now made to FIGS. 10-15, and a second embodiment of the method according to the invention will be described with reference to the production of the blade shell half 11 forming the upwind side of the blade, the method comprising infusing fibre in a mould with a first resin by VARTM, the main laminate and the blade shell half without main laminate being moulded separately and subsequently connected to form the blade shell half.

For manufacturing the blade shell half 11 without main laminate, a rigid mould part similar to or identical with the rigid mould part 13 is provided, said mould part 13 having a mould surface 14 forming the outer surface of the shall half, i.e. the pressure side of the blade. The mould part 13 is provided with an upper rim 15. As described above with reference to FIG. 3, the mould is arranged so that the line of the mould part corresponding to the centre line P of the root region of the blade is arranged tilted slightly upwards relative to horizontal from the root region towards the tip region. In the present embodiment, the lowermost portion of the mould surface in the root region and the tip region is arranged essentially at the same level.

A lay-up 16 comprising a number of fibre fabric layers is placed on the mould surface. In the second embodiment shown, the fibre lay-up comprises first fibre fabric layers 17 arranged on the mould surface. Additionally, a plurality of fibre layers is arranged on the first lower fibre layers 17 at a region corresponding to the region of the leading edge and the trailing edge respectively of the blade shell half to provide a leading edge fibre reinforcement 19 and a trailing edge fibre reinforcement 20. A first core material 21 extends from the leading edge fibre reinforcement 19 towards the lowest area of the mould surface as seen in transverse direction of the mould and a second core material 22 extends from the trailing edge fibre reinforcement towards said lowest area of the mould surface whereby a longitudinally extending recess 66 is formed between the first and second core material. The recess 66 is shaped and dimensioned for receiving the separately formed main laminate. The core material can be a hard polymer foam or balsa wood.

The fibre lay-up 16 can be completed by optionally arranging second fibre layers 23 on top of the leading edge fibre reinforcement 19, the trailing edge fibre reinforcement 20, the first core material 21 and the second core material 22. After the optional arrangement of the second fibre layers 23, a distribution layer 24 is arranged on top of the fibre lay-up.

Further, substantially longitudinally extending feed channels 36-42 are arranged above the distribution layer 24. Resin inlets 46-52 to the respective feed channels are arranged essentially transversely in line essentially at the highest position of the mould surface below the respective feed channel as seen in longitudinal direction.

A vacuum bag 43 is arranged on top of the distribution layer 24 and the feed channels and sealed to the rim 15 of the mould part to form a mould cavity 44 between the vacuum bag 43 and the mould surface 14 of the mould part 13.

As an example, first resin is supplied to the feed channel 38 through the inlet thereof. Correspondingly, first resin is supplied to the feed channel 39 through the inlet 49 thereof. Then, resin is supplied in sequence to the feed channel 40, the feed channel 37, the feed channel 41, the feed channel 38 and the feed channel 42 through the respective inlets. During the sequential supply of first resin to the above feed channels, the supply of first resin to the feed channels 39,38,40, 37,41,36,42 is stopped at pre-determined points in time so as to obtain the desired resin impregnation of the lay-up. When the supply of first resin is completed, the first resin is allowed to cure, and a finished blade shell half without main laminate has been formed.

For manufacturing the main laminate 18, a rigid main laminate mould 63 is provided, said mould 63 having a mould surface 64 forming the outer surface of the main laminate 18. The mould 63 is provided with an upper rim 65. The mould for moulding the main laminate 18 for the upwind shell half can be arranged tilting slightly upwards relative to horizontal in a manner corresponding essentially to the tilt of the mould part for moulding the blade shell half without main laminate. As a result, the height difference between the highest and the lowest point of the lowermost portion of the mould surface 64 is minimised as seen in the longitudinal direction.

The main laminate 18 is formed by placing a plurality of fibre fabric layers on top of each other on the mould surface 64 of the main laminate mould 63.

The fibre fabric layers forming the fibre lay-up of the longitudinally extending main laminate 18 are continuously extending fibre layers or fibre plies placed on top of each other. The majority of the fibre fabric layers of the main laminate 18 are unidirectional fibre fabric layers (UD fabrics), especially UD carbon fibre fabrics, the direction of the UD fibres corresponding essentially to the longitudinal direction of the main laminate mould 63.

During laying up the fibre fabric layers of the main laminate, two mutually spaced segmentation areas are formed dividing the fibre lay-up of the main laminate 18 into three fibre lay-up segments, a first fibre lay-up segment 157, a second fibre lay-up segment 158 and a third fibre lay-up segment 159 as seen in the longitudinal direction of the mould 63 by providing two transverse flow barriers 154,155 in the fibre lay-up, each of the transverse flow barriers 154,155 essentially preventing longitudinal resin flow through the fibre lay-up past the respective flow barrier 154,155.

Each transverse flow barrier 154,155 is a transverse strip of a second resin impregnated into and/or on a majority of the fibre layers of the main laminate fibre lay-up, the strips of impregnated resin being arranged above each other for essentially preventing longitudinal resin flow of the first resin through the main laminate fibre lay-up past the flow barrier 154,155 formed by the second resin.

After the desired plurality of fibre fabric layers have been arranged in the mould, a distribution layer 124 is arranged on top of the fibre fabric lay-up. The distribution layer is divided into three distribution layer segments 124A,124B, 124C by providing two mutually longitudinally spaced distribution layer flow barriers 125,126 in the distribution layer in areas thereof above the main laminate 18. In the present embodiment, the distribution layer flow barriers 125,126 are provided by omitting the distribution layer in transversely extending portions thereof.

Figure 10:
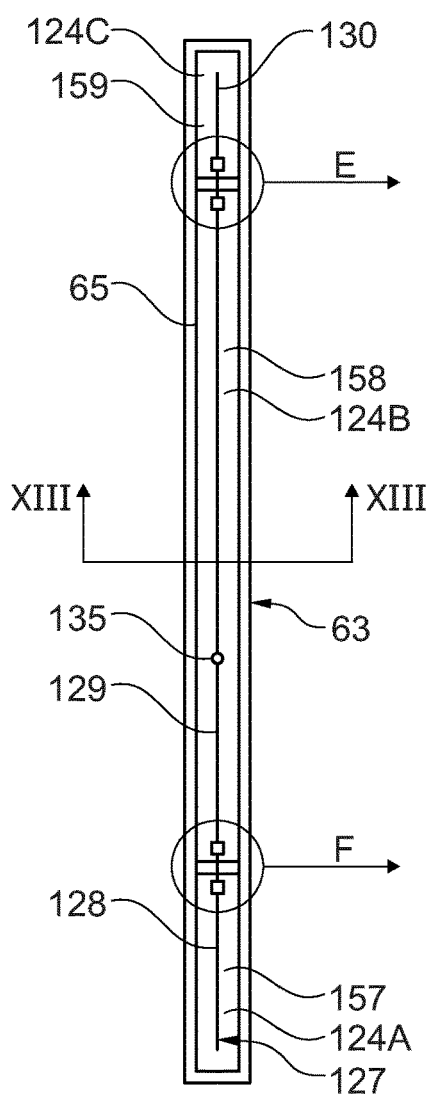
FIG. 10 is a schematical top view of a main laminate mould for manufacturing a main laminate of a wind turbine blade manufactured by the method according to the invention.
Figure 11:
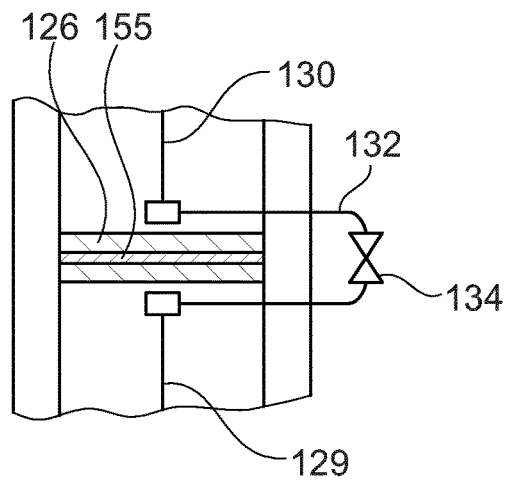
FIG. 11 is an enlarged schematical top view of the encircled area E in FIG. 10.
Figure 12:
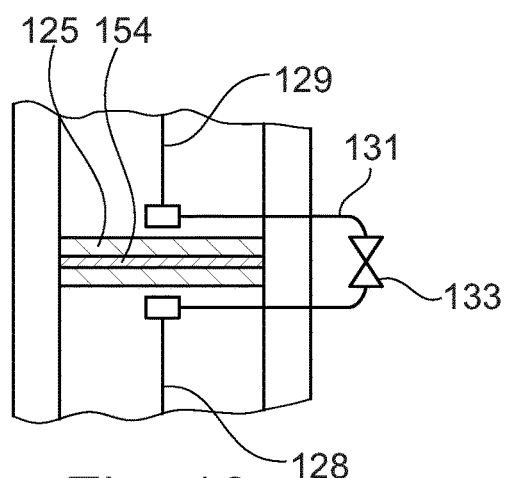
FIG. 12 is an enlarged schematical top view of the encircled area F in FIG. 10.
Figure 13:
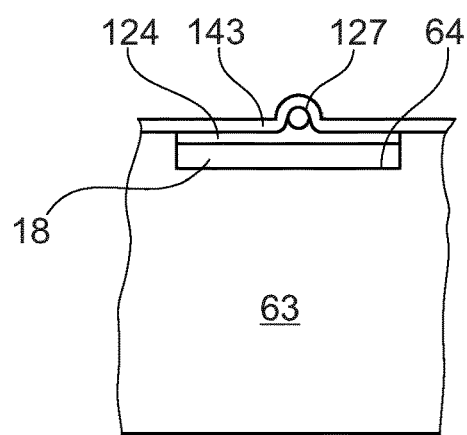
FIG. 13 is a schematical cross-sectional view along the lines XIII-XIII in FIG. 10.
Figure 14:
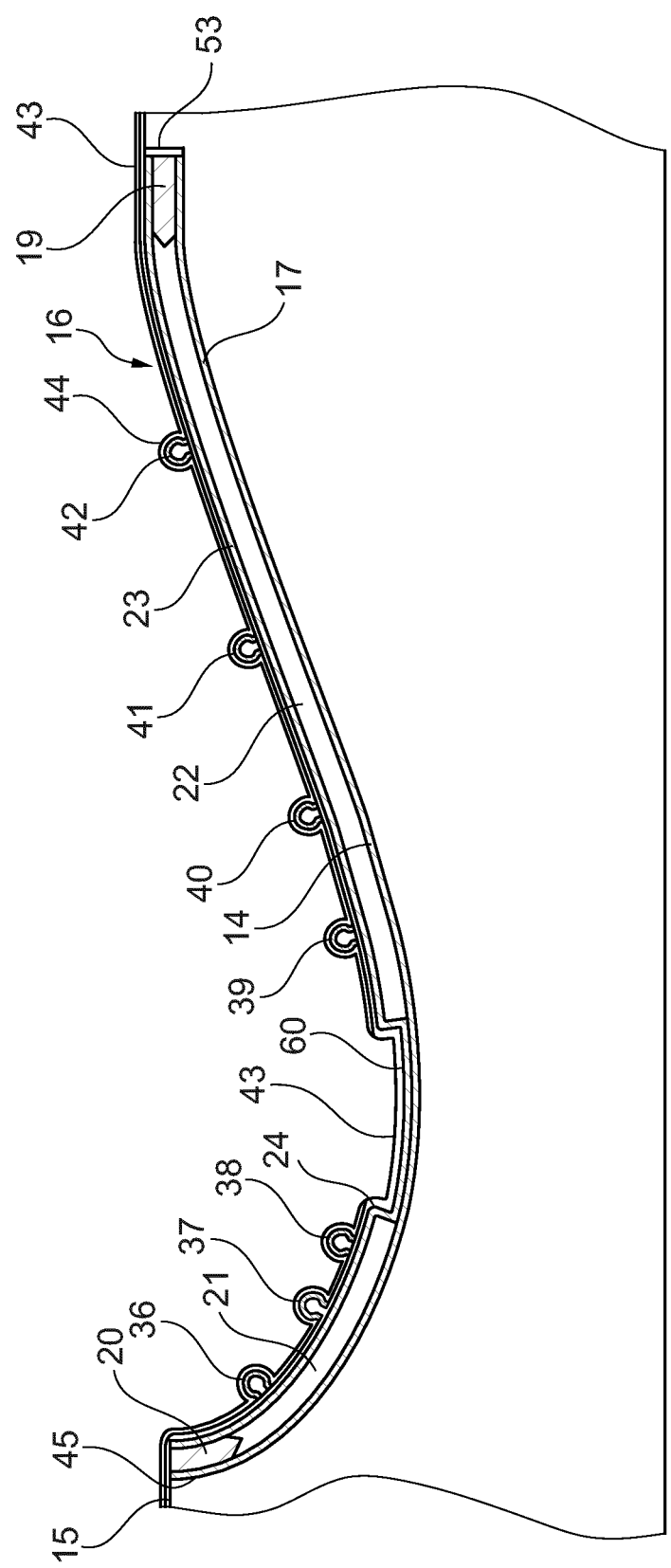
FIG. 14 is a schematical cross-sectional view along the lines IX-IX in FIG. 6 of the mould part shown in FIG. 3 for forming a pressure side blade shell half without main laminate.
Figure 15:
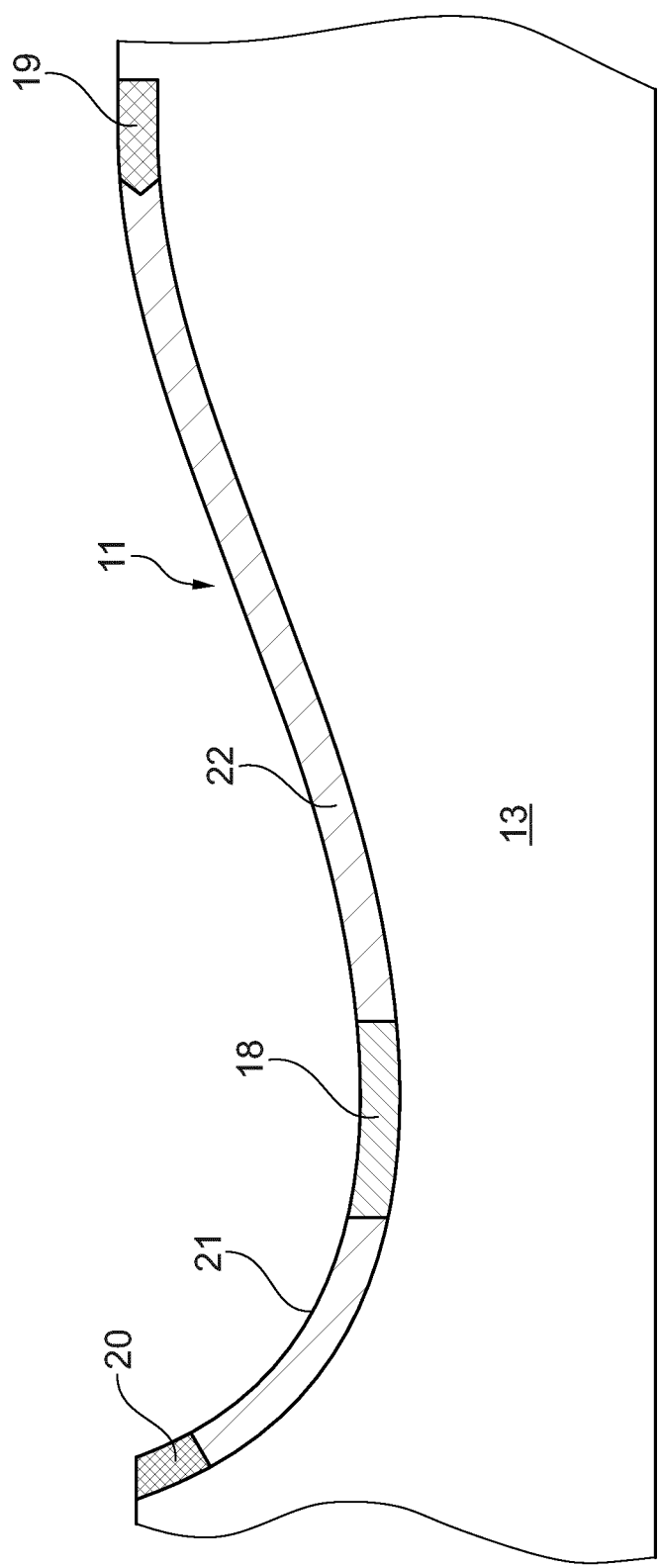
FIG. 15 is a schematical cross-sectional view of the pressure side blade shell half formed without main laminate as shown in FIG. 14, the blade shell half having now been provided with a separately pre-manufactured main laminate.

As especially shown in FIGS. 10,11 and 12, the distribution layer can be divided into distribution layer segments adjacent to or in the segmentation areas in which the fibre lay-up is divided into fibre lay-up segments so that, as seen in the longitudinal direction, a height difference between a lowest and a highest level of the lay-up in any lay-up segments is within a predetermined range, such as below 1.0 m.

A longitudinally extending first feed channel 127 is arranged on top of the distribution layer 124. The first feed channel 127 is formed as a tube with an omega profile being open towards the distribution layer 124. The first feed channel 127 extends essentially over the entire length of the main laminate and is divided into three feed channel segments 128,129,130 which are arranged in respective distribution layer segments. Longitudinally adjacent sections of the first feed channel 127 are interconnected by means of a connection line 131,132, a so-called jumper, to provide resin communication between adjacent feed channel segments. A valve 133,134 is arranged in each connection line 131,132 to allow for an interruption of the resin flow between adjacent feed channel segments. A resin inlet 135 to the first feed channel is preferably provided at or in the highest area of the first feed channel which is also the highest area of the mould surface as seen in the longitudinal direction of the mould. Finally, it should be noted that instead of a jumper between adjacent feed channel segments, each feed channel segment could be provided with a separate resin inlet.

A vacuum bag 143 is arranged on top of the distribution layer 124 and the feed channels and sealed to the rim 65 of the mould part to form a mould cavity between the vacuum bag 143 and the mould surface 64 of the mould 63.

As an example, the first resin is supplied to the mould cavity through the inlet 135 to the mid-section 129 of the first feed channel 127, the valves 133,134 in the connection lines 131,132 being open so that all three sections 128,129, 130 of the first feed channel 127 are supplied with first resin. The valves 133,134 are closed to stop supply of the first resin to sections 128,130 of the first feed channel 127 after a predetermined period of time and a predetermined fibre/resin ratio has been obtained in the first and third lay-up segment 157,159 of the main laminate. Supply of resin through the inlet 135 is stopped when the desired fibre/resin ratio has been obtained in the second lay-up segment 158 and in the first and third lay-up segments 157,159 of the main laminate.

The provision of the distribution layer flow barriers 125,126 restricts or prevents flow of first resin through the distribution layer from the distribution layer segment 124B to the distribution layer segments 124A and 124C being positioned at a lower level than the distribution layer segment 124B during the continuous supply of resin to the feed channel segment 129 being positioned above the distribution layer segment 124B. Further importantly, the fibre lay-up barriers 154,155 in the main laminate 18 essentially prevent flow of first resin from the central second fibre lay-up 58 of the main laminate into the lower positioned first and third fibre lay-up 56,58. Thereby, the desired fibre to resin ratio is obtainable essentially throughout the blade shell half and especially very importantly throughout the main laminate 18. At the same time during the supply of liquid first resin to the lay-up, forming the main laminate, liquid first resin is coming into intimate contact with the fibre lay-up barriers 154,155 and is unified with the barrier to form a homogeneous resin mass.

When the supply of first resin is completed, the first resin is allowed to cure, and main laminate is finished. Thereafter, the main laminate can be removed from the main laminate mould and adhesively connected to the upwind shell half without main laminate for forming the upwind shell half. The adhesive connection between the main laminate and the shell half can be provided by arranging the main laminate in the shell part without main laminate by infusing resin between the inner surface of the shell half and the main laminate, e.g. by VARTM.

The above method of the present invention has been described with regard to embodiments where the transverse flow barrier in especially the fibre lay-up of the main laminate is a transverse strip formed of a second resin of the same type as the first resin supplied to the mould and essentially preventing longitudinal flow of the first resin past the transverse barrier.

In the second aspect of the present invention, the transverse flow barrier in the fibre lay-up is a transverse strip of a substance preventing longitudinal resin flow through especially the fibre lay-up of the main laminate. The substance is configured to be progressively dissolved and thereby allow longitudinal resin flow through the fibre lay-up when coming into contact with the first resin during infusion of the fibre lay-up with the first resin.

The second aspect of the method of the invention can be elucidated by reading the above embodiment with the understanding that the transverse flow barriers (fibre lay-up flow barriers 54,154 and 55,155) are barriers of a substance being dissolved after coming in contact with the first resin in a predetermined period of time and thereby allowing flow of the first resin past the respective flow barriers.

LIST OF REFERENCES 1 tower
2 nacelle
3 main shaft
4 hub
5 blades
6 root region
7 airfoil region
8 tip region
9 transition region
10 tip
11 blade shell half
12 blade shell half
13 mould part
14 mould surface
15 upper rim
16 fibre lay-up
17 first fibre layers
18 load-bearing structure=main laminate
19 leading edge fibre reinforcement
20 trailing edge fibre reinforcement
21 first core material
22 second core material
23 second fibre layers
24,124 distribution layer
24A,124A distribution layer segment
24B,124B distribution layer segment
24C,124C distribution layer segment
25,125 distribution layer flow barrier
26,126 distribution layer flow barrier
27,127 first feed channel
128,128 feed channel segment
29,129 feed channel segment
30, 130 feed channel segment
31,131 connection line
32,132 connection line
33,133 valve
34,134 valve
35,135 resin inlet
36-42 additional feed channel
43,143 vacuum bag
44 mould cavity
45 leading edge
46-52 resin inlet
53 trailing edge
54,154 fibre lay-up flow barrier
55,155 fibre lay-up flow barrier
56,156 fibre lay-up of main laminate
57,157 first fibre lay-up segment of main laminate
58,158 second fibre lay-up segment of main laminate
59,159 third fibre lay-up segment of main laminate
60 resin inlet
61 resin inlet
63 mould
64 mould surface
65 upper rim
66 recess
a distance
P centre line
W wind direction

The invention claimed is:
1. A method of manufacturing a wind turbine blade comprising an aerodynamic shell forming an outer surface of the blade and at least one main laminate, especially a pre-bent wind turbine blade, the method comprising the steps of:
- a. providing a mould extending in a longitudinal direction;
- b. forming a longitudinally extending main laminate by arranging a fibre material lay-up comprising a plurality of longitudinally continuously extending fibre fabric layers or fibre plies placed on top of each other in the mould;
- c. during step b, providing at least one segmentation area in the fibre lay-up dividing the fibre lay-up into at least two fibre lay-up segments as seen in the longitudinal direction of the mould by providing at least one transverse flow barrier in the fibre lay-up, the at least one transverse flow barrier preventing or restricting longitudinal resin flow through the fibre lay-up past the flow barrier, wherein the at least one transverse flow barrier comprises a transverse strip of a second resin impregnated into and/or on a majority of the fibre fabric layers of the fibre material lay-up, the transverse strips of the majority of the fibre fabric layers being arranged above each other for preventing the longitudinal resin flow through the fibre material lay-up past the flow barrier;
- d. infusing the fibre lay-up in the mould with a first liquid resin supplied to the mould through one or more resin inlet(s); and
- e. allowing the first resin to cure,
  wherein step d is performed using Vacuum Assisted Resin Transfer Moulding (VARTM),
  wherein step d is performed after step c and prior to step e, and wherein step d comprises:
  providing a vacuum bag and arranging it on top the mould part,
  sealing the vacuum bag to the rigid mould part to provide a mould cavity,
  evacuating the mould cavity and supplying a first liquid resin to the mould cavity through a resin inlet.

2. The method according to claim 1, wherein in step c at least two mutually spaced segmentation areas are provided in the fibre lay-up, whereby the fibre lay-up is divided into at least three fibre lay-up segments as seen in the longitudinal direction of the mould.

3. The method according to claim 1, wherein at least a majority of the fibre fabric layers placed on top of each other are unidirectional fibre fabrics layers (UD fabrics), especially UD carbon fibre fabrics, the direction of the UD fibres corresponds essentially to the longitudinal direction of the mould.

4. The method according to claim 1, comprising the following step after step c and prior to step d:
- c1. arranging a resin distribution layer above the fibre lay-up.

5. The method according to claim 4, comprising the following step subsequent to step c1 and prior to step d:
- c2. dividing the resin distribution layer into at least two distribution layer segments as seen in the longitudinal direction of the mould by providing at least one transversely extending distribution layer flow barrier preventing or restricting longitudinal resin flow through the distribution layer.

6. The method according to claim 5, wherein in step c2 the transversely extending distribution layer flow barrier is provided by omitting the distribution layer in a transversely extending portion thereof.

7. The method according to claim 5, comprising the following step subsequent to step c2 and prior to step d:
- c3. placing at least one first longitudinally extending resin feed channel above the fibre distribution layer, said first feed channel being open towards the fibre distribution layer so as to provide resin communication with the resin distribution layer.

8. The method according to claim 7, wherein said first feed channel is divided into at least two separate feed channel segments, a feed channel segment being arranged in each distribution layer segment, and a resin inlet being provided in each of the two feed channel segments so as to allow feeding resin to each of the at least two distribution layer segments.

9. The method according to claim 1, wherein the first feed channel is divided into feed channel segments and the distribution layer is divided into distribution layer segments adjacent to or in a segmentation area in which the fibre lay-up is divided into fibre lay-up segments.

10. The method according to claim 1, wherein the first feed channel is divided into feed channel segments and the distribution layer is divided into distribution layer channels adjacent to or in a segmentation area in which the fibre lay-up is divided into fibre lay-up segments so that, as seen in the longitudinal direction, a height difference between a lowest and a highest level of the lay-up in any lay-up segments is at most 2.4 m.

11. The method according to claim 1, wherein essentially all the fibre fabric layers of the fibre lay-up comprise a transverse strip of the second resin impregnated into and/or on the respective layers of the fibre fabric lay-up, said strips of impregnated resin being arranged above each other.

12. The method according to claim 1, wherein the second resin of the strip impregnated with resin is of a resin type being compatible with the first resin type supplied to the mould.

13. The method according to claim 12, wherein the second resin of the strip impregnated with resin is of the same resin type as the first resin type supplied to the mould.

14. The method according to claim 1, wherein the width of the transverse flow barrier of the second resin is 2 mm to 20 mm as seen in the longitudinal direction of the mould.

15. The method according to claim 1, wherein the transverse flow barrier in the fibre lay-up is a transverse strip of a substance applied to a majority of the fibre fabric layers of the fibre lay-up, said strips of the substance being arranged above each other for temporarily essentially preventing longitudinal resin flow through the fibre lay-up past the flow barrier, the substance being configured to be progressively at least partly dissolved and thereby allow longitudinal resin flow through the fibre lay-up, when coming into contact with the first resin during the infusion of the fibre lay-up with the first resin.

16. The method according to claim 15, wherein the width of the transverse flow barrier of the substance is 1 mm to 50 mm as seen in the longitudinal direction of the mould.

17. The method according to claim 15, wherein the substance of the strips of the flow barrier is configured to be at least partly dissolved to allow longitudinal resin flow through the fibre lay-up 15 min to 320 min after coming into contact with the first resin.

18. The method according to claim 1, wherein the mould is a main laminate mould in which the at least one main laminate is formed and cured, and the method additionally comprises the following steps:
  manufacturing of a cured aerodynamic shell in a shell form for forming the outer surface of the blade; and adhesively connecting the formed and cured main laminate to a longitudinal portion of the manufactured aerodynamic shell.

19. The method according to claim 1, wherein the mould is a shell and main laminate mould in which the shell and the at least one main laminate is formed and cured, and the method additionally comprises the following step:

prior to step b, laying up a number of shell-forming fibre layers in the mould, the shell fibre layers defining the outer surface of the blade.

* * * * *